US011358245B2

(12) United States Patent
Siddle et al.

(10) Patent No.: US 11,358,245 B2
(45) Date of Patent: Jun. 14, 2022

(54) T-SLOT ALIGNMENT COMPENSATION MOUNTING SYSTEM

(71) Applicants: Justin Siddle, Farmersville Station, NY (US); James Tuttle, Delevan, NY (US); Nicholas Sinno, South Wales, NY (US)

(72) Inventors: Justin Siddle, Farmersville Station, NY (US); James Tuttle, Delevan, NY (US); Nicholas Sinno, South Wales, NY (US)

( * ) Notice: Subject to any disclaimer, the term of this patent is extended or adjusted under 35 U.S.C. 154(b) by 0 days.

(21) Appl. No.: 17/124,489

(22) Filed: Dec. 16, 2020

(65) Prior Publication Data

US 2021/0178537 A1 Jun. 17, 2021

Related U.S. Application Data

(60) Provisional application No. 62/948,475, filed on Dec. 16, 2019.

(51) Int. Cl.
*B23Q 3/06* (2006.01)
(52) U.S. Cl.
CPC ..................... *B23Q 3/06* (2013.01)
(58) Field of Classification Search
CPC .. B23Q 3/102; B23Q 3/06–069; B23Q 3/142; B23Q 1/525; B23Q 1/42; B23Q 1/50; B23Q 1/52; B23Q 1/5437; B23Q 16/06; B23Q 16/065; B23Q 7/02; B23K 37/0452; B23K 37/04; B23K 37/0408; B23K 37/0426–0461; B25H 1/0007; B25H 1/18; F16B 37/045; B23B 31/026; B23B 31/0261; B23B 39/06
USPC .... 269/101, 291, 289 R, 309–310; 29/281.1, 29/281.5
See application file for complete search history.

(56) References Cited

U.S. PATENT DOCUMENTS

| 3,090,612 | A | * | 5/1963 | Rouse | B25B 5/08 269/91 |
| 4,915,367 | A | * | 4/1990 | Carossino | B25B 1/08 269/101 |
| 2001/0004099 | A1 | * | 6/2001 | Onishi | F16B 37/045 248/49 |
| 2021/0245316 | A1 | * | 8/2021 | Pulsifer | B23Q 3/06 |

FOREIGN PATENT DOCUMENTS

| KR | 20160001434 A | * | 1/2016 | ............... B23Q 3/06 |
| KR | 20170062287 A | * | 6/2017 | |

OTHER PUBLICATIONS

English Translation of KR 20170062287 (Year: 2017).*
English Translation of KR 20160001434 (Year: 2016).*

* cited by examiner

*Primary Examiner* — Monica S Carter
*Assistant Examiner* — Michael A Gump (57) ABSTRACT

A T-slot mounting and alignment system for non-rigidly mounting a workpiece or fixture to a work-piece positioner table, welding positioner table or machine tool table having one of more T-slots includes a T-dog, a dog nut, at least one bolt, and at least one fastener. The at least one fastener fastens the T-dog to the workpiece or fixture, and a dog stem of the T-dog extends through a guide slot in the workpiece or fixture and into the T-slot in the table. The dog nut mates with the at least one bolt and tightens to engage a distal end of the dog stem, wherein clearance is provided in the assembled structures to prevent the workpiece or fixture from being tightly clamped against the table. Consequently, compensation for misalignments is possible during setup.

7 Claims, 10 Drawing Sheets

T-SLOT ALIGNMENT COMPENSATION MOUNTING SYSTEM

The current application claims a priority to the U.S. Provisional Patent application Ser. No. 62/948,475 filed on Dec. 16, 2019.

FIELD OF THE INVENTION

The present invention relates generally to mounting systems. More particularly, the present invention relates to a T-slot mounting system for mounting fixtures and workpieces to a machine tool or positioner, such as a welding positioner.

BACKGROUND OF THE INVENTION

Machine tools and workpiece positioners are known to include one or more tables to which a workpiece, or a fixture configured to receive and hold a workpiece, may be removably attached. Such tables may include one or more elongated T-shaped slots ("T-slots") used for mounting the workpiece or fixture to the table. Each T-slot is characterized by an inverted T-shaped channel having a relatively wide cross-portion adjacent a rear surface of the table, and a relatively narrow stem portion extending from the rear surface of the table through a front surface of the table. The workpiece or fixture may be clamped to the front surface of the table using a block having a T-shaped cross-sectional configuration (a "T-block") sized for slidable receipt along a T-slot of the table. The T-block may include one or more threaded bolt holes accessible from a front side of the table for receiving one or more bolts arranged to extend through a corresponding hole or slot in the workpiece or fixture and into a corresponding bolt hole in the T-block. The bolts may be tightened to directly clamp the workpiece or fixture between the head of the bolt and the front surface of the table, or a washer, clamping plate, or clamping bar may be provided between the head of the bolt and the workpiece or fixture to distribute clamping force over a greater surface area. As may be understood, a cross-portion of the T-block is retained in the T-slot and engages the rear surface of the table to enable clamping.

In a common configuration, the table may have a central hub defining a rotational axis about which the table rotates to position the workpiece in a manufacturing operation, and a plurality of T-slots extending radially from the rotational axis of the table. The task of mounting the workpiece or fixture on the table may involve properly locating the workpiece or fixture in a pair of translational degrees of freedom (i.e. orthogonal X and Y directions) and in a rotational degree of freedom (i.e. opposite angular directions about the rotational Z axis).

In a headstock-tailstock welding positioner, a headstock having a powered table driven to rotate by a motor is arranged opposite a tailstock having a nonpowered table mounted for rotation. A workpiece or fixture may have opposite ends respectively mounted to the table of the headstock and the table of the tailstock by T-blocks and mating bolts, whereby powered rotation of the headstock table causes the workpiece or fixture, and the tailstock table, to rotate. In such a setup, it is highly desirable from a safety standpoint to avoid a rigid mounting of the workpiece or fixture to the headstock and tailstock tables. Misalignment of the headstock and tailstock rotational axes, for example as a result of inaccurately machined workpieces or fixtures, may create stresses tending to separate the workpiece or fixture from the tables or damage the headstock and tailstock, leading to an unsafe work condition, a scrapped workpiece, and/or a machine failure.

It would be desirable, therefore, to provide a T-slot mounting system which prevents a setup technician or operator from rigidly mounting a workpiece or fixture to a T-slotted table of a work-piece positioner, welding positioner or machine tool.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

SUMMARY

The present disclosure provides a T-slot mounting system for mounting a workpiece or fixture to a table having one more T-slots in non-rigid fashion, thereby allowing compensation for misalignments. The T-slot mounting system generally comprises a T-dog, a dog nut, at least one bolt, and at least one fastener. The T-dog includes a dog stem and a dog flange, wherein the dog stem is sized for receipt through a guide slot in the workpiece or fixture and into a stem portion of the T-slot and has at least one bolt passage extending therethrough, and the dog flange defines an abutment surface adjacent the dog stem. The dog nut is sized for receipt within a cross-portion of the T-slot, and each bolt is sized to extend through a bolt passage of the dog stem for mating with the dog nut. The at least one fastener is configured to fasten the T-dog to the workpiece or fixture such that the abutment surface of the dog flange abuts with the workpiece or fixture. The bolt or bolts are adjustable to a tightened condition in which the dog nut engages the distal end of the dog stem, such that the workpiece or fixture is non-rigidly mounted to the table due to clearance between the dog nut and an internal shoulder surface of the T-slot, and/or clearance between a front surface of the table and an opposing surface of the workpiece or fixture. As a result, the workpiece or fixture may be tilted slightly relative to the table to compensate for misalignments.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a t-slot alignment compensation mounting system 100 for removably mounting a workpiece or a fixture 200 to a machine positioner such as a welding positioner 300. Though the present invention is intended for use with any positioners, it should be understood that the present invention may be utilized in conjunction with any applicable end use, and should not be restricted to use with welding positioners. The present invention may be utilized in conjunction will all welding, painting, assembly and inspection positioners manual or robotic in operation or control.

In general, referring to FIGS. 1-6, the present invention comprises at least one mounting table 1, a T-dog 2, a dog nut 3, and at least one bolt 4. In the preferred embodiment of the present invention, the at least one mounting table 1 may be understood to correspond to a headstock mounting table 14 or a tailstock mounting table 15 of a welding positioner 300, though in various embodiment, the at least one mounting table 1 may be any type of mounting table. The at least one mounting table 1 may generally be understood to have a large panel-like structure with a flat front surface 11, or mounting surface, though the at least one mounting table 1 may vary in shape and structure as applicable in various different embodiments. In some embodiments, for example, the at least one mounting table 1 is generally rectangular in shape. In some embodiments, the at least one mounting table 1 may be generally circular in shape. A "dog" as used herein is known in the art as a tool, part of a tool, or other component that prevents movement or imparts movement by offering physical obstruction or engagement of some kind, holding another object in place by blocking, clamping, or otherwise obstructing movement of the object. The T-dog 2 is a dog formed into a T shape, and the dog nut 3 complements the T-dog 2 in clamping a workpiece or fixture 200 to the at least one mounting table 1.

Each of the at least one mounting table 1 comprises a front surface 11, a rear surface 12, and at least one t-slot 13, wherein the present invention is utilized to mount a workpiece or fixture 200 to the front surface 11. Each of the at least one t-slot 13 traverses across the at least one mounting table 1 and through the front surface 11. Further, each of the at least one t-slot 13 is sized to receive the dog nut 3 and retain the dog nut 3 between the front surface 11 and the rear surface 12, and the dog nut 3 is slidably positioned within an arbitrary T-slot 130 from the at least one t-slot 13. The arbitrary T-slot 130 may correspond to any member of the at least one t-slot 13 and descriptions thereof may be considered in some embodiments to be universal to each member of the at least one t-slot 13, as it is desirable for the T-slots to be uniform with each other. However, this is not a strict requirement, and various members of the at least one t-slot 13 may vary from each other in any desirable fashion short of departing from the intended spirit and scope of the present invention as disclosed herein. The T-dog 2 is removably positioned into the arbitrary T-slot 130 adjacent to the dog nut 3, and the at least one bolt 4 is removably engaged between the T-dog 2 and the dog nut 3, wherein the at least one bolt 4 is adjustable to a tightened configuration, wherein the dog nut 3 and the T-dog 2 are abutted together in the tightened configuration, and wherein a workpiece or fixture endplate may be non-rigidly mounted between the T-dog 2 and the at least one mounting table 1 in the tightened configuration.

Figure 1:
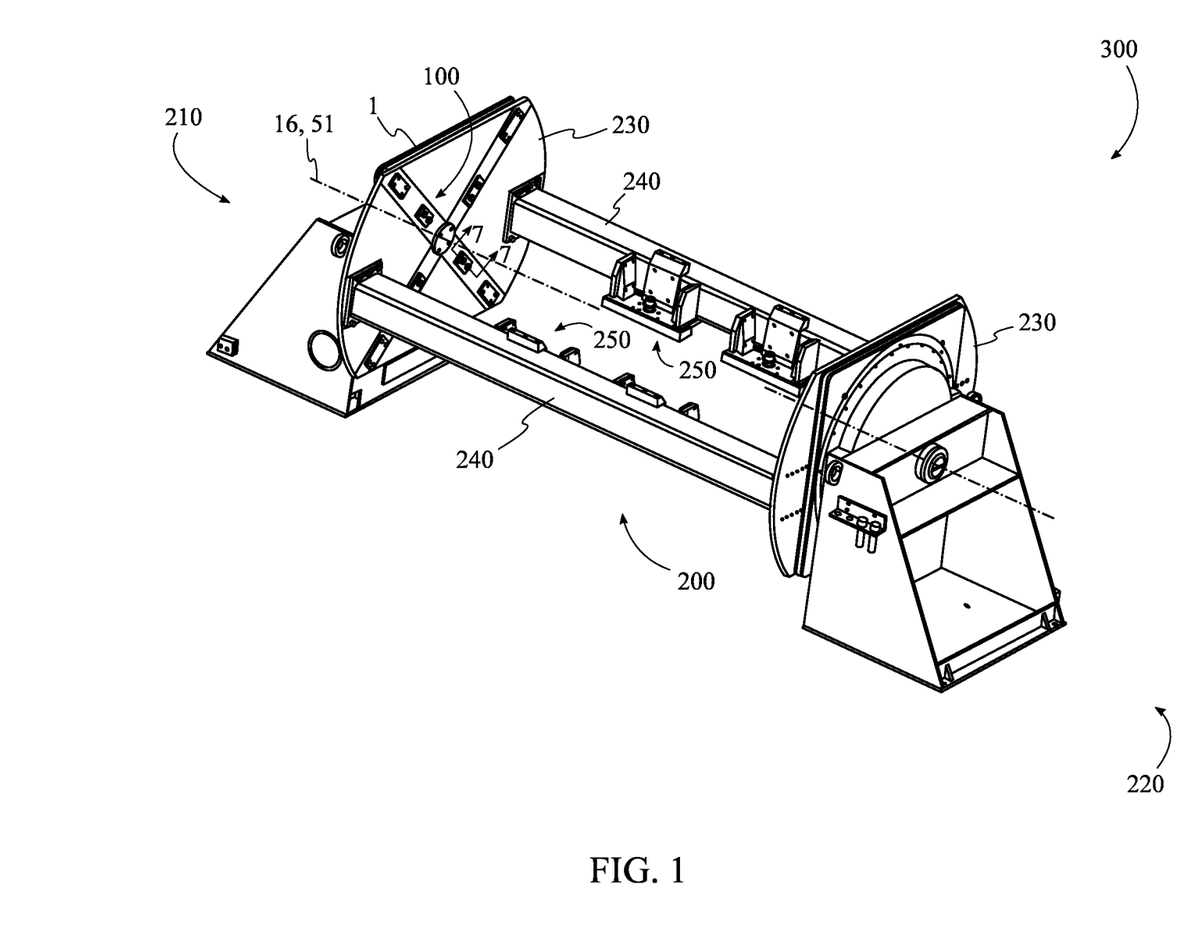
FIG. 1 is a perspective view of a positioner apparatus to which a fixture is mounted by way of a T-slot mounting system formed in accordance with an embodiment of the present disclosure.
Figure 2:
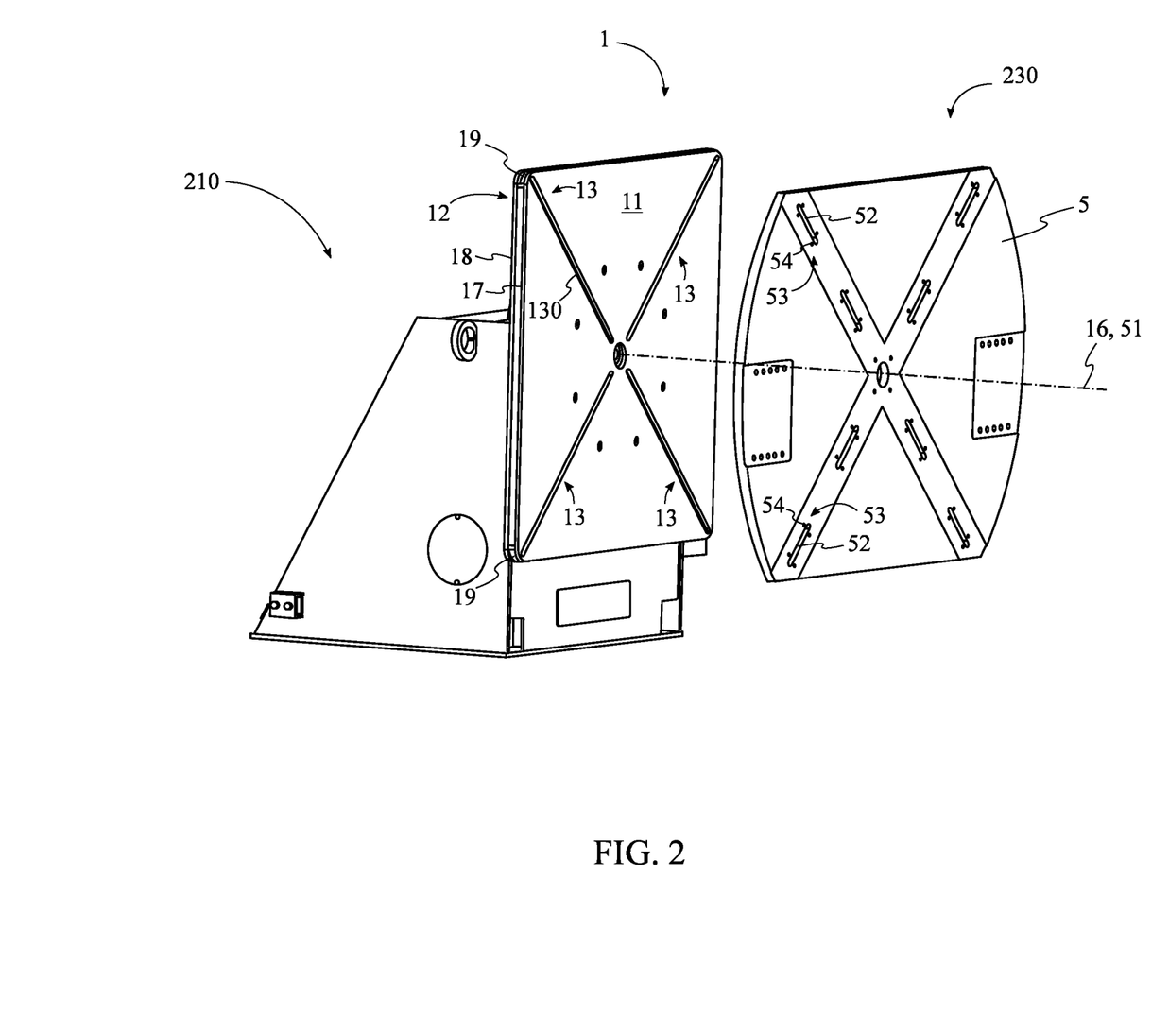
FIG. 2 is an exploded perspective view showing a headstock of the positioner apparatus and a mounting plate of the fixture.

As previously mentioned, in the preferred embodiment, the at least one mounting table 1 comprises a headstock mounting table 14 and a tailstock mounting table 15 of a welding positioner 300. Further, in the preferred embodiment, each of the at least one mounting table 1 further comprises a rotational axis 16. In some embodiments, for example, the mounting table 14 of the headstock 210 is rotationally driven by a motor about the rotational axis 16 of the table of the headstock 210, while the mounting table 15 of the tailstock 220 is passively rotatably mounted to the tailstock 220 about the rotational axis 16 of the table 15 of the tailstock 220, and during a work operation is rotationally driven by the motor of the headstock 210 through the fixture 200 or workpiece held between the headstock 210 and the tailstock 220.

In the preferred embodiment of the present invention, each of the at least one t-slot 13 is oriented perpendicular to the rotational axis 16 of the mounting table 1, and the at least one t-slot 13 is radially distributed about the rotational axis 16 of the mounting table 1. It is contemplated, however, that the geometrical distribution of the at least one t-slot 13 on the mounting table 1 should not be considered to be limited to any particular configuration, and the at least one t-slot 13 may be positioned about the mounting table 1 as desirable in various embodiments.

Figure 3:
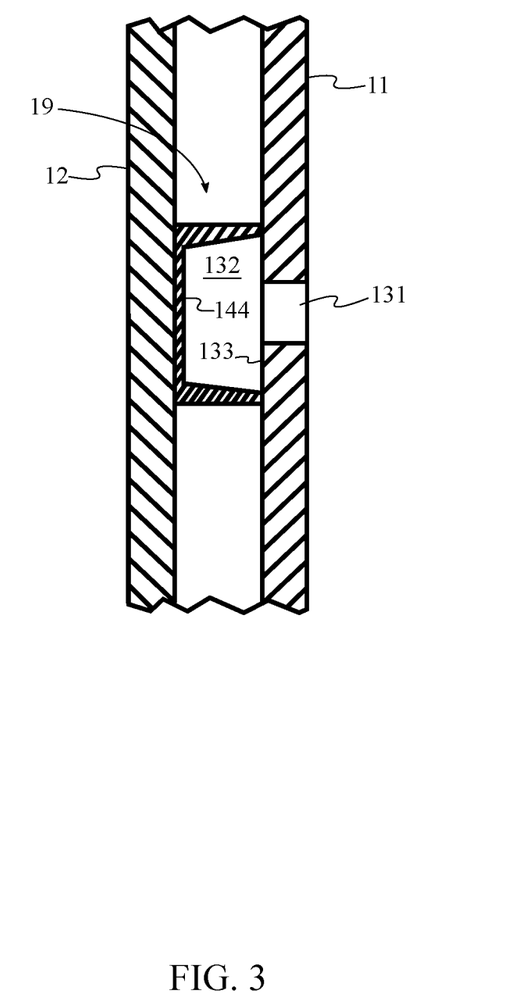
FIG. 3 is a cross-sectional view illustrating a T-slot in a mounting table of the headstock.
Figure 4:
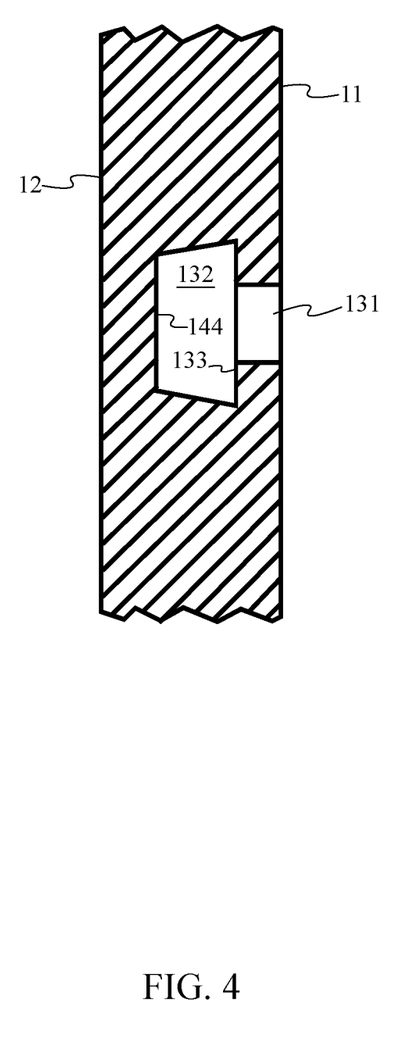
FIG. 4 is cross-sectional view illustrating an alternative configuration for forming the T-slot in a mounting table of the headstock.

In the preferred embodiment of the present invention, each of the at least one t-slot 13 comprises a stem portion 131 and a cross portion 132, as shown in FIGS. 3-4. The stem portion 131 traverses through the front surface 11, and the cross portion 132 is positioned adjacent to the stem portion 131 opposite the front surface 11 along the stem portion 131. The cross portion 132 therefore defines an internal shoulder surface 133 of the at least one mounting table 1, wherein the internal shoulder surface 133 is positioned opposite the front surface 11 along the stem portion 131, and wherein an internal back surface 144 of the cross portion 132 is positioned opposite the internal shoulder surface 133 within the cross portion 132 of the T-slot.

Figure 5:
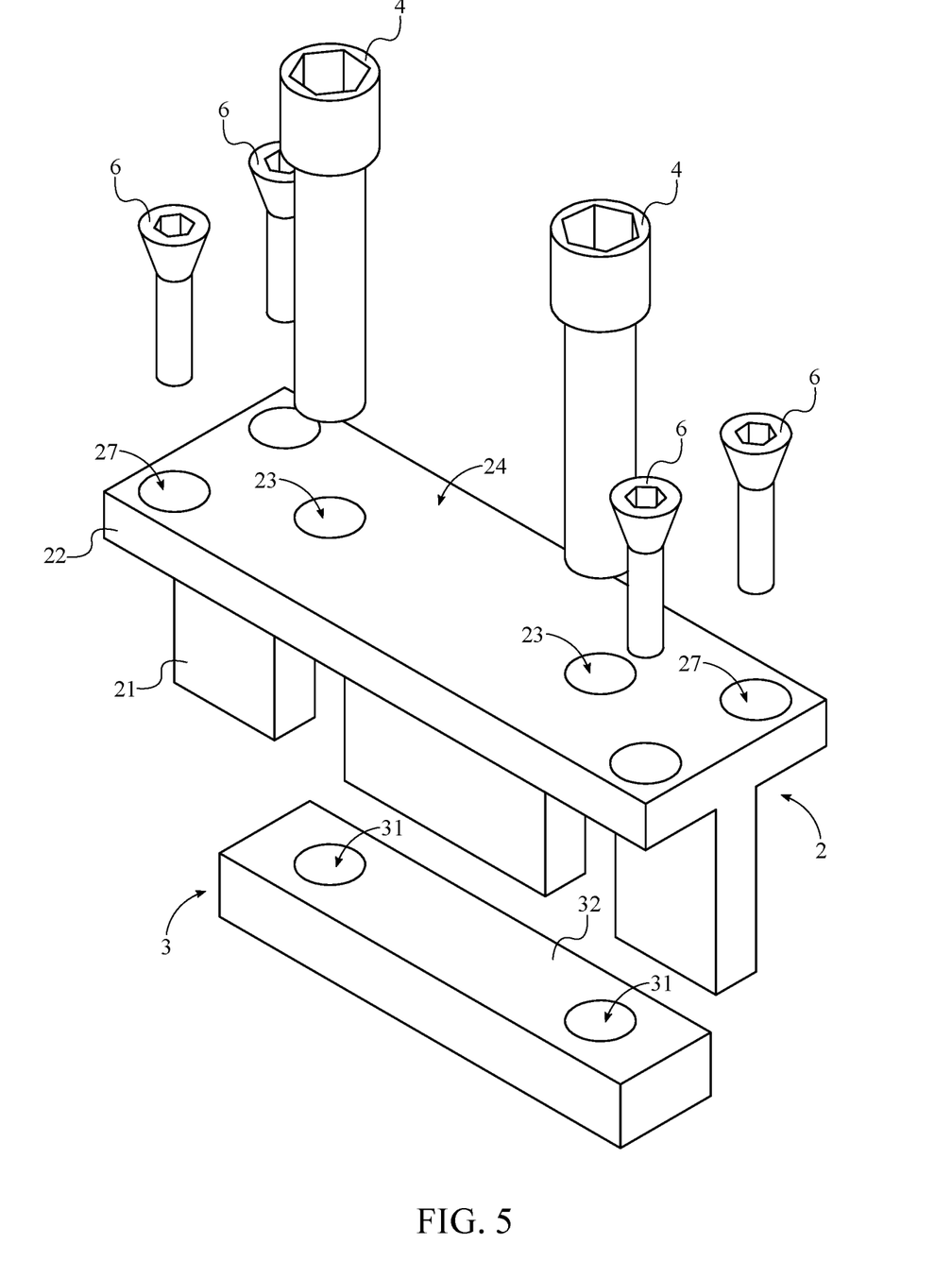
FIG. 5 is a raised perspective exploded view showing structural components of the T-slot mounting system in isolation.
Figure 6:
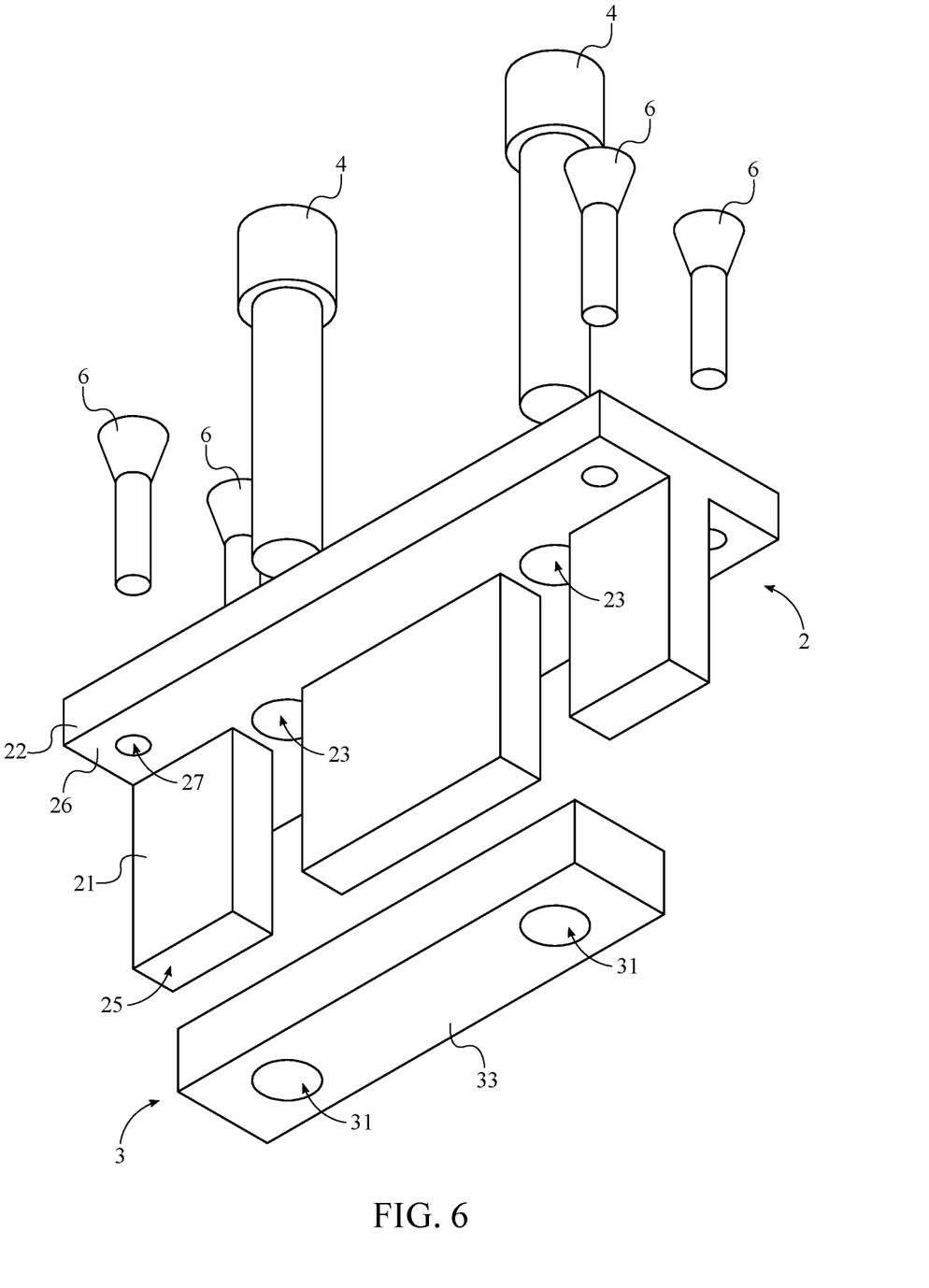
FIG. 6 is a lowered perspective exploded view showing structural components of the T-slot mounting system in isolation.

Similarly, referring to FIGS. 5-6, the T-dog 2 comprises a dog stem 21, a dog flange 22, at least one bolt passage 23, a proximal end 24, a distal end 25, and an abutment surface 26. The T-dog 2 extends between the proximal end 24 and the distal end 25, parallel to the dog stem 21. The dog flange 22 extends between the proximal end 24 and the abutment surface 26, wherein the abutment surface 26 and the proximal end 24 are positioned terminally opposite each other along the dog flange 22. The dog stem 21 is connected to the dog flange 22 at the abutment surface 26, such that the dog stem 21 extends between the abutment surface 26 and the distal end 25. More particularly, in the preferred embodiment, the dog stem 21 is perpendicularly connected to the dog flange 22 and positioned centrally on the dog flange 22 such that the dog stem 21 bifurcates the dog flange 22.

Each of the at least one bolt passage 23 traverses through the T-dog 2 between the proximal end 24 and the distal end 25. The specific nature, geometry, position, and number of the at least one bolt passage 23 may vary in different embodiments, so long as the at least one bolt passage 23 allows the at least one bolt 4 to affix the T-dog 2 and the dog nut 3 to each other and displace the T-dog 2 and the dog nut 3 toward each other in order to achieve the tightened configuration.

Figure 7:
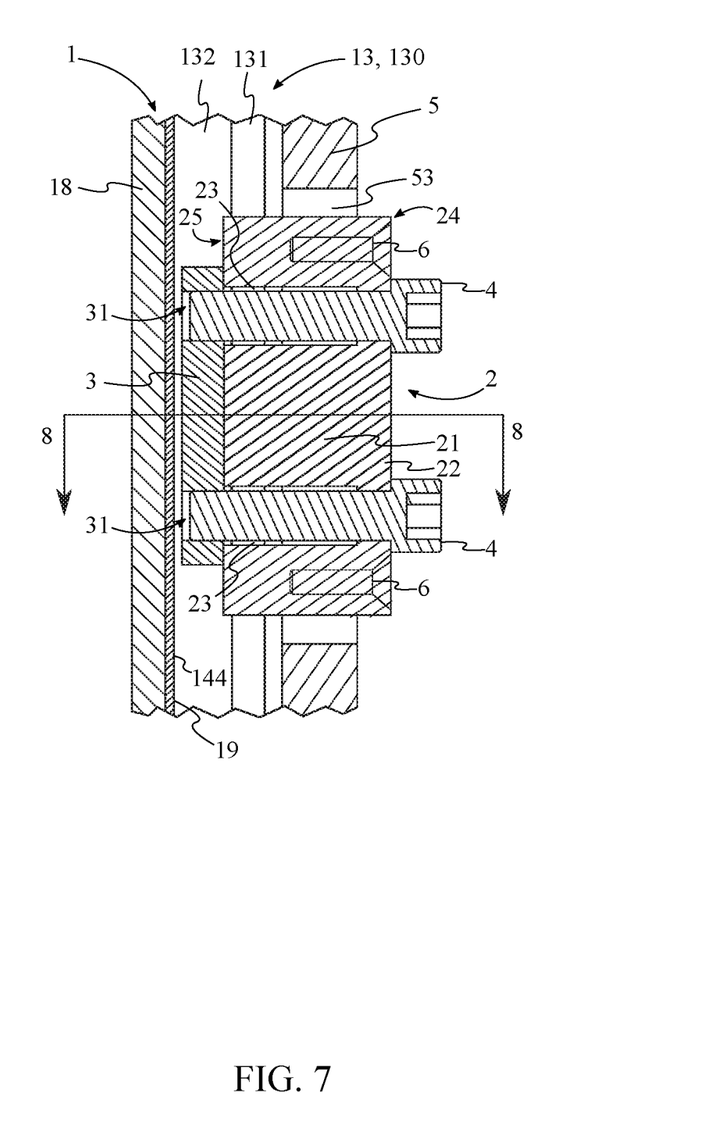
FIG. 7 is a cross-sectional view taken along line 7-7 in FIG. 1.
Figure 8:
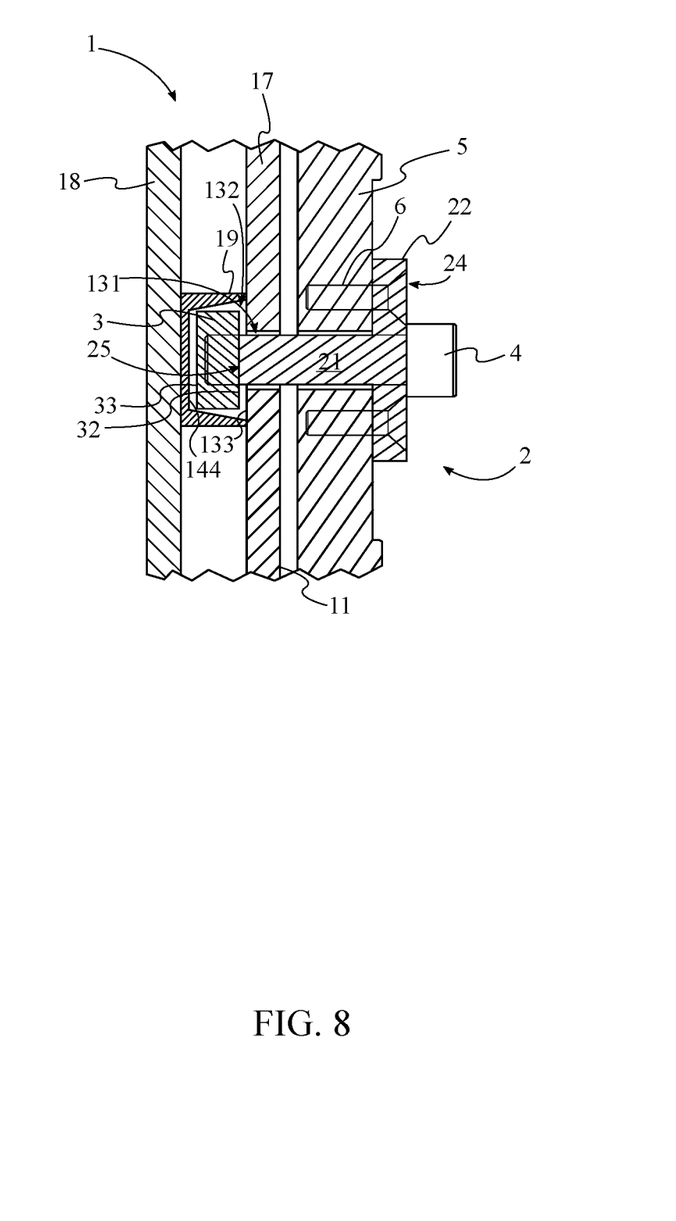
FIG. 8 is a cross-sectional view taken along line 8-8 in FIG. 7.

Referring to FIGS. 7-8, The dog nut 3 is slidably positioned within the cross portion 132 of the arbitrary T-slot 130, while the dog stem 21 is removably positioned within the stem portion 131 of the arbitrary T-slot 130 through the front surface 11, wherein the stem portion 131 of each of the at least one t-slot 13 is sized to receive the dog stem 21. Each of the at least one bolt 4 is removably positioned through one of the at least one bolt passage 23, and each of the at least one bolt 4 is removably and threadedly engaged with one of at least one threaded hole 31 of the dog nut 3, wherein the at least one bolt 4 is configured to abut the dog nut 3 and the distal end 25 of the dog stem 21 together into the tightened configuration.

As previously mentioned, the present invention is intended for use to non-rigidly affix either a workpiece or a fixture 200 between the headstock 210 and tailstock 220 of a work-piece positioner or welding positioner. In the case of the present invention being used to mount a workpiece to be worked on directly, the workpiece may be affixed directly to the mounting tables of the headstock 210 and tailstock 220. This may be the case when a workpiece is comparatively large. Alternatively, in a configuration for accommodating smaller workpieces, a fixture 200 may be mounted between the headstock 210 and the tailstock 220, wherein the fixture 200 includes a pair of fixture end plates 230 connected to each other by a pair (or more) of elongated support members 240, in addition to a plurality of holder assemblies 250 positioned on the support members 240 configured to releasably hold one or more workpieces on the fixture 200.

To this end, in some embodiments, the present invention further provides a mounting plate 5, wherein the mounting plate 5 corresponds to one of a pair of end plates 230 of a fixture 200. Such embodiments preferably further comprise at least one fastener 6. The mounting plate 5, being distinct from the previously described mounting table 1, is embodied as an end plate of the fixture 200, and may be mounted to the mounting table 1 through the t-slot alignment system 100 of the present invention. Preferably, the mounting plate 5 comprises a rotational axis 51 and a plurality of elongated guide slots 52. The plurality of elongated guide slots 52 traverse through the mounting plate 5 parallel to the rotational axis 51 of the mounting plate 5. Moreover, each of the plurality of elongated guide slots 52 is preferably oriented perpendicular to the rotational axis 51 of the mounting plate 5, and the plurality of elongated guide slots 52 is radially distributed about the rotational axis 51 of the mounting plate 5. Similarly to the at least one t-slot 13, the number, position, and orientation of the plurality of elongated guide slots 52 may vary as desirable in different embodiments. In general, however, the number, position, and orientation of the plurality of elongated guide slots 52 should correspond to the number, position, and orientation of the at least one t-slot 13 of the mounting table 1, such that the T-slots 130 of the mounting table 1 and the guide slots 52 of the mounting plate 5 are aligned with each other when in use.

Thus, the T-dog 2 is removably positioned through one of the plurality of elongated guide slots 52 into the arbitrary T-slot 130, wherein each of the plurality of elongated guide slots 52 is radially aligned about the rotational axis 51 of the mounting plate 5 with one of the at least one t-slot 13.

Optionally, the T-dog 2 may be removably affixed to the mounting plate 5 through the at least one fastener 6, though it is generally desired to do so in order to establish a secure connection. More particularly, in the preferred embodiment, the T-dog 2 further comprises at least one fastener hole 27, while the mounting plate 5 further comprises a plurality of locating hole groups 53, wherein each of the plurality of locating hole groups 53 comprises at least one locating hole 54. Each of the plurality of locating hole groups 53 is positioned adjacent to and arranged around one of the plurality of elongated guide slots 52. Thus, each of the at least one fastener 6 is removably engaged into the at least one fastener hole 27 and one of the at least one locating hole 54 of one of the plurality of locating hole groups 53 in order to attach the T-dog 2 to the mounting plate 5.

In various embodiments, the specific means through which the T-slot is formed may vary. In some embodiments, each of the at least one mounting table 1 further comprises a front plate 17, a rear plate 18, and at least one channel member 19, as shown in FIG. 3. The aforementioned front surface 11 is positioned on the front plate 17, and the rear surface 12 is positioned on the rear plate 18, the front 11 and rear 12 surfaces each facing outward from their respective plates. Each of the at least one channel member 19 is connected between the front plate 17 and the rear plate 18. More particularly, each of the at least one channel member 19 is sandwiched between the front plate 17 and the rear plate 18. The channel member 19 is generally U-shaped, having a base and a pair of side walls positioned opposite each other on the base and extending outward perpendicularly or similar from the base, delineating an open end opposite the base along the side walls. As previously mentioned, the stem portion 131 of each of the at least one t-slot 13 traverses through the front plate 17. More particularly, each of the at least one channel member 19 is aligned with the stem portion 131 of one of the at least one t-slot 13, wherein the cross portion 132 of each of the at least one t-slot 13 is internally delineated by one of the at least one channel member 19, and wherein the stem portion 131 communicates with the cross portion 132 delineated by the channel member 19. Moreover, since each channel member 19 is wider than the stem portion 131, an internal shoulder surface 133 is defined opposite the front surface 11 on the rear plate 18, internal to the cross portion 132. In the tightened configuration, the dog nut 3 abuts against the internal shoulder surface 133, allowing the T-dog 2 and the dog nut 3 to produce a clamping force on a workpiece or fixture 200 end plate through the at least one bolt 4.

Figure 9:
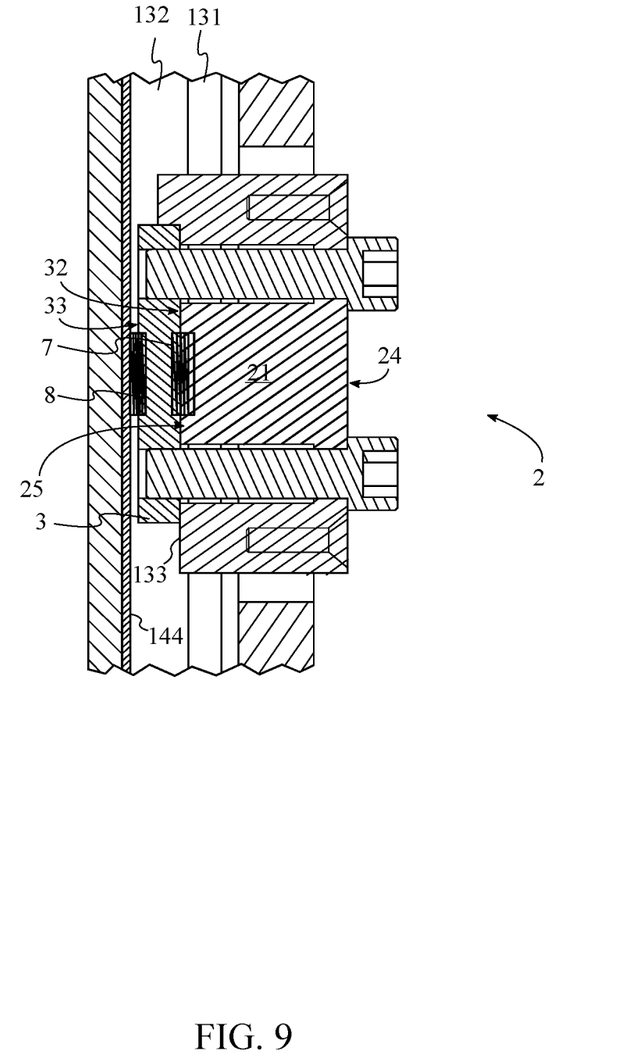
FIG. 9 is a similar cross-sectional view to that of FIG. 7 showing a modified embodiment of the T-slot mounting system incorporating springs.
Figure 10:
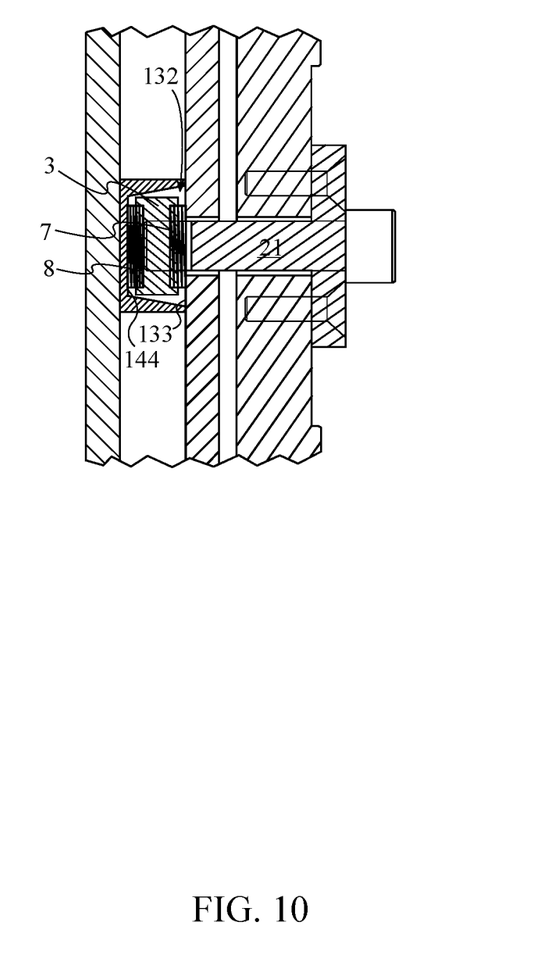
FIG. 10 is a similar cross-sectional view to that of FIG. 8 showing the modified embodiment of the T-slot mounting system incorporating springs.

Further, some embodiments of the present invention further comprise at least one first spring 7 and at least one second spring 8, as shown in FIGS. 9-10. Such embodiments are considered for application where a workpiece is connected between the pair of fixture end plates 230, and where the workpiece is to be removed, and once removed, there is no structure forming a rigid connection between the pair of fixture end plates 230. Each of the at least one first spring 7 is connected to a first side 32 of the dog nut 3, wherein the at least one first spring 7 is configured to apply a first tensile spring force between the first side 32 of the dog nut 3 and the distal end 25 of the T-dog 2. Each of the at least one second spring 8 is connected to a second side 33 of the dog nut 3, opposite the first side 32, wherein the at least one second spring 8 is configured to apply a second tensile spring force between the second side 33 of the dog nut 3 and the internal back surface 144 of the arbitrary T-slot 130.

The at least one first spring 7 is configured to cause the corresponding fixture 200 end plate to remain parallel to the front surface 11 of the mounting table 1 until another workpiece is installed between the pair of end plates 230. The at least one first spring 7 may be arranged to provide a biasing force acting between the dog nut 3 and the internal shoulder surface 133, thus holding the fixture 200 end plate parallel to the front surface 11 of the mounting table 1.

The at least one second spring 8 may be arranged to provide a biasing force acting between the dog nut 3 and the internal back surface 144 of the arbitrary T-slot 130. The at least one first spring 7 and the at least one second spring 8 may be any suitable type of compression spring, including but not limited to spring washers and coil springs. In some embodiments, recesses may be provided in the dog nut 3 and the distal end 25 of the stem portion 131 of the T-dog 2 in order to locate and retain the at least one first spring 7 and the at least one second spring 8.

Although the invention has been explained in relation to its preferred embodiment, it is to be understood that many other possible modifications and variations can be made without departing from the spirit and scope of the invention as hereinafter claimed.

What is claimed is:

1. A t-slot alignment compensation mounting system comprising:
   at least one mounting table;
   T-dog comprising a dog stem, a dog flange, at least one bolt passage, a proximal end, a distal end, and an abutment surface;
   a dog nut;
   at least one bolt;
   each of the at least one mounting table comprising
     a front surface,
     a rear surface,
     at least one T-slot,
     a front plate,
     a rear plate,
     at least one channel member, each of the at least one channel member
     being connected between the front plate and the rear plate,
     a stem portion of each of the at least one T-slot traversing through the front plate, and
     each of the at least one channel member being aligned with the stem portion of one of the at least one T-slot, wherein a cross portion of each of the at least one T-slot is internally delineated by one of the at least one channel member, wherein the front surface being positioned on the front plate, the rear surface being positioned on the rear plate, and
     an internal shoulder surface being positioned opposite the front surface on the front plate
     each of the at least one T-slot traversing across the at least one mounting table and through the front surface;
     each of the at least one T-slot being sized to receive the dog nut and retain the dog nut between the front surface and the rear surface;
     the dog nut being slidably positioned within an arbitrary T-slot from the at least one T-slot;
     the T-dog being removably positioned into the arbitrary T-slot adjacent to the dog nut; and
     the at least one bolt being removably engaged between the T-dog and the dog nut, wherein the at least one bolt is adjustable to a tightened configuration, wherein the dog nut and the T-dog are abutted together in the tightened configuration, and wherein a workpiece or fixture endplate may be non-rigidly mounted between the T-dog and the at least one mounting table in the tightened configuration.

2. The t-slot alignment compensation mounting system as claimed in claim 1, wherein the at least one mounting table comprises a headstock mounting table and a tailstock mounting table of a work-piece positioner or welding positioner.

3. The t-slot alignment compensation mounting system as claimed in claim 1 comprising:
   the at least one mounting table further comprising a rotational axis;
   each of the at least one T-slot being oriented perpendicular to the rotational axis of the mounting table; and
   the at least one T-slot being radially distributed about the rotational axis of the mounting table.

4. The t-slot alignment compensation mounting system as claimed in claim 1 comprising:
   each of the at least one T-slot comprising the stem portion and the cross portion
   the stem portion traversing through the front surface;
   the cross portion being positioned adjacent to the stem portion opposite the front surface along the stem portion, wherein the cross portion defines the internal shoulder surface of the at least one mounting table, wherein the internal shoulder surface is positioned opposite the front surface along the stem portion, and wherein an internal back surface of the cross portion is positioned opposite the internal shoulder surface;
   the T-dog extending between the proximal end and the distal end;
   the dog flange extending between the proximal end and the abutment surface, wherein the abutment surface and the proximal end are positioned opposite each other along the dog flange;
   the dog stem being connected to the dog flange at the abutment surface, wherein the dog stem extends between the abutment surface and the distal end;
   each of the at least one bolt passage traversing through the T-dog between the proximal end and the distal end;
   the dog nut being slidably positioned within the cross portion of the arbitrary T-slot;
   the dog stem being removably positioned within the stem portion of the arbitrary T-slot through the front surface, wherein the stem portion of each of the at least one T-slot is sized to receive the dog stem;
   each of the at least one bolt being removably positioned through one of the at least one bolt passage; and
   each of the at least one bolt being removably and threadedly engaged with one of at least one threaded hole of the dog nut, wherein the at least one bolt is configured to abut the dog nut and the distal end of the dog stem together in the tightened configuration.

5. The t-slot alignment compensation mounting system as claimed in claim 1 comprising:
a mounting plate, wherein the mounting plate is one of a pair of end plates of a fixture;
at least one fastener;
the mounting plate comprising a rotational axis and a plurality of elongated guide slots;
the plurality of elongated guide slots traversing through the mounting plate parallel to the rotational axis of the mounting plate;
each of the plurality of elongated guide slots being oriented perpendicular to the rotational axis of the mounting plate;
the plurality of elongated guide slots being radially distributed about the rotational axis of the mounting plate;
the T-dog being removably positioned through one of the plurality of elongated guide slots into the arbitrary T-slot, wherein each of the plurality of elongated guide slots is radially aligned about the rotational axis with one of the at least one T-slot; and
the T-dog being removably affixed to the mounting plate through the at least one fastener.

6. The t-slot alignment compensation mounting system as claimed in claim 5 comprising:
the T-dog further comprising the dog flange and at least one fastener hole;
the mounting plate further comprising a plurality of locating hole groups, wherein each of the plurality of locating hole groups comprises at least one locating hole;
each of the plurality of locating hole groups being positioned adjacent to one of the plurality of elongated guide slots; and
each of the at least one fastener being removably engaged into one of the at least one fastener hole and one of the at least one locating hole of one of the plurality of locating hole groups in order to attach the T-dog to the mounting plate.

7. The t-slot alignment compensation mounting system as claimed in claim 1 comprising:
at least one first spring and at least one second spring;
each of the at least one first spring being connected to a first side of the dog nut, wherein the at least one first spring is configured to apply a first spring force between the first side of the dog nut and the distal end of the T-dog; and
each of the at least one second spring being connected to a second side of the dog nut, opposite the first side, wherein the at least one second spring is configured to apply a second spring force between the second side of the dog nut and an internal back surface of the arbitrary T-slot.

* * * * *